United States Patent
Rosenbalm et al.

(10) Patent No.: US 7,766,387 B1
(45) Date of Patent: Aug. 3, 2010

(54) ANTI-SKID TIRE CHAIN DEVICE

(75) Inventors: Ronald D. Rosenbalm, North Vernon, IN (US); Michael D. Gilpin, North Vernon, IN (US)

(73) Assignee: Onspot of North America, Inc., North Vernon, IN (US)

( * ) Notice: Subject to any disclaimer, the term of this patent is extended or adjusted under 35 U.S.C. 154(b) by 303 days.

(21) Appl. No.: 11/888,861

(22) Filed: Aug. 2, 2007

(51) Int. Cl.
*B60T 1/00* (2006.01)
(52) U.S. Cl. .............. 280/757; 280/763.1; 180/16; 301/42; 301/44.4; 188/4 B
(58) Field of Classification Search .......... 180/16; 188/4 B; 280/757, 763.1; 301/42, 44.1, 301/44.4
See application file for complete search history.

(56) References Cited

U.S. PATENT DOCUMENTS

| | | | | |
|---|---|---|---|---|
| 2,283,948 A * | 5/1942 | Ridgway | ............ | 188/4 B |
| 2,442,322 A * | 5/1948 | Daley | ............ | 188/4 B |
| 2,790,514 A * | 4/1957 | Robinson | ............ | 188/4 R |
| 2,808,139 A * | 10/1957 | Bowers | ............ | 192/12 R |
| 2,809,704 A * | 10/1957 | Greely | ............ | 180/15 |
| 3,068,949 A * | 12/1962 | Sirois | ............ | 180/313 |
| 4,214,632 A | 7/1980 | Brookshier | ............ | 172/42 |
| 4,299,310 A | 11/1981 | Törnbäck | ............ | 188/4 R |
| 4,745,993 A * | 5/1988 | Schulz et al. | ............ | 188/4 B |
| 4,751,975 A * | 6/1988 | Rieger et al. | ............ | 180/16 |
| 4,800,939 A * | 1/1989 | Torneback | ............ | 152/214 |
| 4,800,992 A * | 1/1989 | Andersson et al. | ............ | 188/4 B |
| 4,809,797 A * | 3/1989 | Guyot | ............ | 180/16 |
| 4,840,399 A | 6/1989 | Rieger et al. | ............ | 280/757 |
| 5,080,443 A * | 1/1992 | Torneback | ............ | 301/6.1 |
| 5,332,015 A * | 7/1994 | Zeiser | ............ | 188/4 B |
| 5,785,351 A * | 7/1998 | Chang et al. | ............ | 280/757 |
| 5,834,662 A * | 11/1998 | Stoll et al. | ............ | 74/425 |
| 6,341,635 B1 | 1/2002 | Robeson | ............ | 152/225 R |
| 6,409,215 B1* | 6/2002 | Holmgren | ............ | 280/757 |
| 6,830,134 B2* | 12/2004 | Choi | ............ | 188/4 B |
| 7,118,130 B2 | 10/2006 | Rosenbalm | ............ | 280/757 |
| 7,506,729 B2* | 3/2009 | Smith et al. | ............ | 188/4 B |
| 2005/0167946 A1* | 8/2005 | Rampp | ............ | 280/491.1 |

FOREIGN PATENT DOCUMENTS

EP 0 487 297 A1 5/1992

* cited by examiner

*Primary Examiner*—Paul N Dickson
*Assistant Examiner*—James English
(74) *Attorney, Agent, or Firm*—Woodard, Emhardt, Moriarty, McNett & Henry LLP

(57) ABSTRACT

An anti-skid device for a vehicle for positioning a traction member beneath a vehicle wheel includes a support member that is attached to the vehicle, a pivoting swing arm with a traction wheel with traction members thereon, and a drive assembly attached to the support member and to the swing arm so as to extend and retract the swing arm. The drive assembly includes a gear-reduced electric motor that is coupled to a worm that meshes with a worm gear that is attached to the swing arm shaft. As the motor moves in a first direction, the gear mesh causes the arm to deploy and, in a reverse direction, the swing arm retracts. Spring-biasing is provided so as to maintain pressure of the traction wheel against the vehicle wheel and limit switches are provided so as to turn the drive motor on and off.

17 Claims, 16 Drawing Sheets

ANTI-SKID TIRE CHAIN DEVICE

BACKGROUND OF THE INVENTION

The present invention relates in general to anti-skid devices for vehicles. More specifically, the present invention relates to a device that provides a rotatable member with links of chain, or other traction or friction increasing means, intended to be thrown sequentially under a wheel of a vehicle for increased traction between the wheel and the road surface. One device of the type generally described above is disclosed in U.S. Pat. No. 4,800,939 issued to Törnebäck. Another device of the type generally described above is disclosed in U.S. Pat. No. 7,118,130, issued Oct. 10, 2006 to Rosenbalm. Both of these U.S. patents are incorporated by reference herein in their entirety.

The Törnebäck device utilizes an inflatable bellows to extend the movable arm that includes the pulley. It is important to note that a supply source of air for the bellows is required in order for the Törnebäck device to be operable. A suitable supply of air is likely available with larger vehicles such as semi-tractor trailers. Smaller passenger vehicles such as SUVs and trucks are not likely to have a suitable air supply. Another consideration with smaller passenger vehicles of the type described is the available space within and/or beneath the frame for securing an anti-skid device in position.

As described in the '939 patent, devices of this kind typically include a pulley provided with strands or links of chain or some other friction increasing means for sequentially positioning the chain beneath the vehicle wheel between the wheel and the road surface. Devices of this kind are not as simple to construct as would appear from the principle itself. Chains, pulleys, and other supports are, to start with, subject to very substantial forces necessitating heavy duty construction. Furthermore, a relatively large movement is required to displace the chain carrying pulley between its working position in contact with the vehicle wheel and its operative stored or stowed position. To store the pulley is particularly troublesome since different cars and passenger vehicles have different available places for the pulley. Furthermore, the pulley should be sufficiently elevated so that the chains attached to the pulley or chain wheel do not drag on the ground as this causes the links of chain to be worn prematurely. A result of the above requirements and problems that need to be solved with automatic anti-skid devices of the type described is that they are comparatively costly to produce which in turn results in a number of individuals being reluctant to obtain these safety increasing aids.

The Rosenbalm device includes an anti-skid device for use in cooperation with a vehicle wheel for positioning a traction member beneath the vehicle wheel includes a frame assembly constructed and arranged to be attached to the vehicle, a swing arm pivotally connected to the frame, and an electric, linear actuator having an extendable shaft. The anti-skid device includes a double pivot link where one end is attached to the frame assembly and the opposite end is attached to the swing arm. The linear actuator is attached to a movable pressure plate and a biasing spring is positioned between the movable pressure plate and a back plate for applying and maintaining contact pressure of the traction wheel against the vehicle wheel. In the preferred embodiment, the traction member is a length of chain that is connected to the traction wheel for positioning between the vehicle wheel and the road surface.

While the Törnebäck and Rosenbalm devices represent a couple of design options for these type of tire chain devices, a further option is to use an electric drive motor (but not involving any linear actuator as in Rosenbalm) as part of the deployment structure. The use of a reversible, electric drive motor, properly sized and gear reduced, yields a more compact design without requiring any vehicle or accessory air supply and without requiring any type of linear actuator or solenoid or similar cylinder. The desirable spring-biased aspect of the '130 Rosenbalm patent would preferably still need to be provided, but in a different structural configuration. The presently disclosed structure, as described and illustrated herein, achieves a compact design configuration by the use of an electric drive motor. In addition, a worm and worm gear combination is used for low speed and power amplification in combination with a biasing spring arrangement and appropriate gear reduction. These components and systems are provided and integrated in a novel and unobvious manner.

BRIEF SUMMARY

An anti-skid device for use in cooperation with a vehicle wheel for positioning a traction member beneath the vehicle wheel according to one embodiment of the present invention comprises a support member constructed and arranged to be attached to a vehicle, a swing arm including a traction wheel with at least one traction member thereon, a drive assembly attached to the support member and to the swing arm and being constructed and arranged to extend and retract wherein extending the swing arm places the traction wheel against the vehicle wheel, and a drive assembly including a worm gear, a worm constructed and arranged to mesh with the worm gear, an electric motor, a shaft for coupling the swing arm to the worm gear, and a second shaft for coupling the electric motor to the worm, wherein operation of the electric motor moves the swing arm by way of the worm and worm gear combination.

One object of the present disclosure is to provide an improved anti-skid tire chain device.

DETAILED DESCRIPTION

Figure 1:
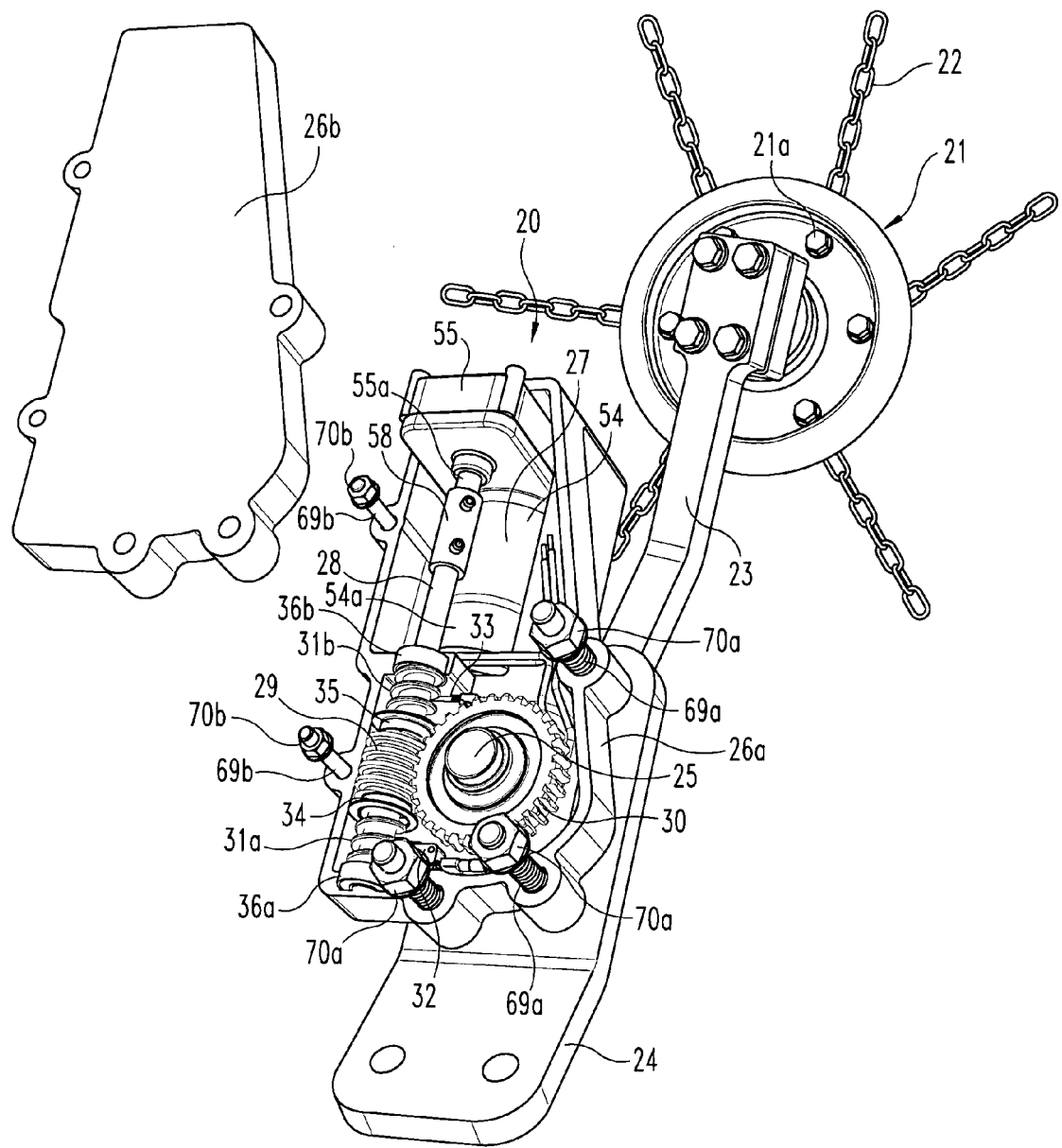
FIG. 1 is a perspective view of an anti-skid tire chain device according to a typical embodiment of the present invention.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

Referring to FIG. 1, there is illustrated an anti-skid, tire chain device 20 that is constructed and arranged according to the present invention. Device 20 includes a chain wheel 21 with six strands 22 of chain securely attached to the chain wheel 21, each strand 22 being connected through a corresponding one of six wheel holes 21a. Also included as part of device 20 is a swing arm 23, mounting plate 24, shaft 25, housing body 26a, housing cover 26b, electric motor assembly 27, drive shaft 28, worm 29, worm wheel or gear 30, springs 31a and 31b, extend limit switch 32, retract limit switch 33, switch sleeve bushings 34 and 35, and sealed ball bearings 36a and 36b. The requisite electric power required to drive the electric motor assembly 27 is provided by vehicle battery power and is activated or controlled by a dashboard-mounted switch (not illustrated). This switch is a toggle switch having an ON position corresponding to a deployed swing arm 23 and an OFF position corresponding to a retracted or stowed position for the swing arm 23. The electric motor 54 includes a brake 54a, as further described herein.

Figure 3:
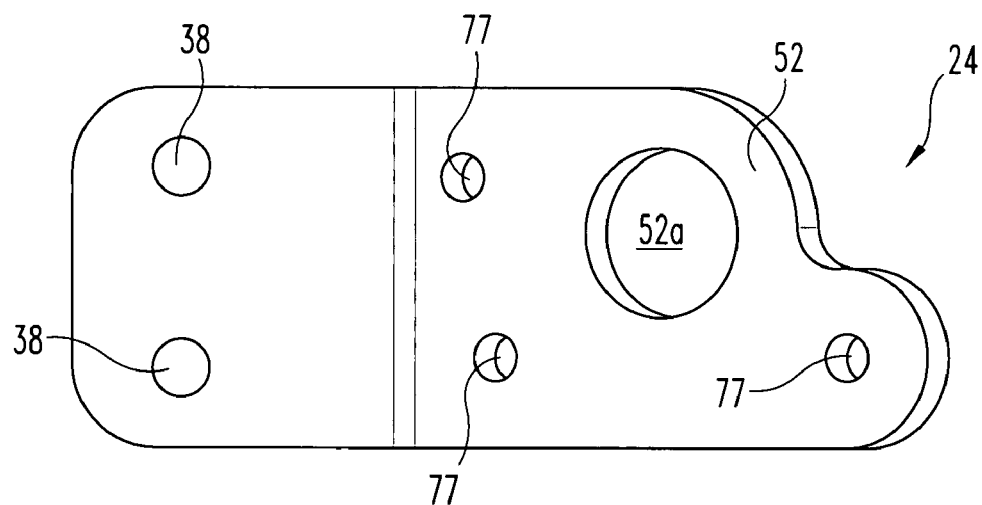
FIG. 3 is a side elevational view of a mounting plate comprising one portion of the FIG. 1 device.
Figure 4:
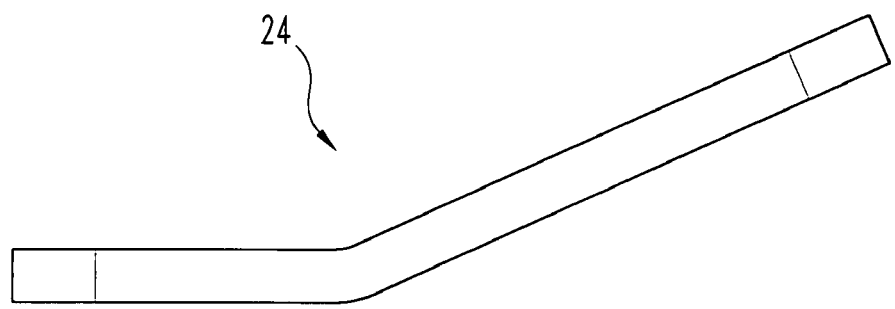
FIG. 4 is a top plan view of the FIG. 3 mounting plate.
Figure 5:
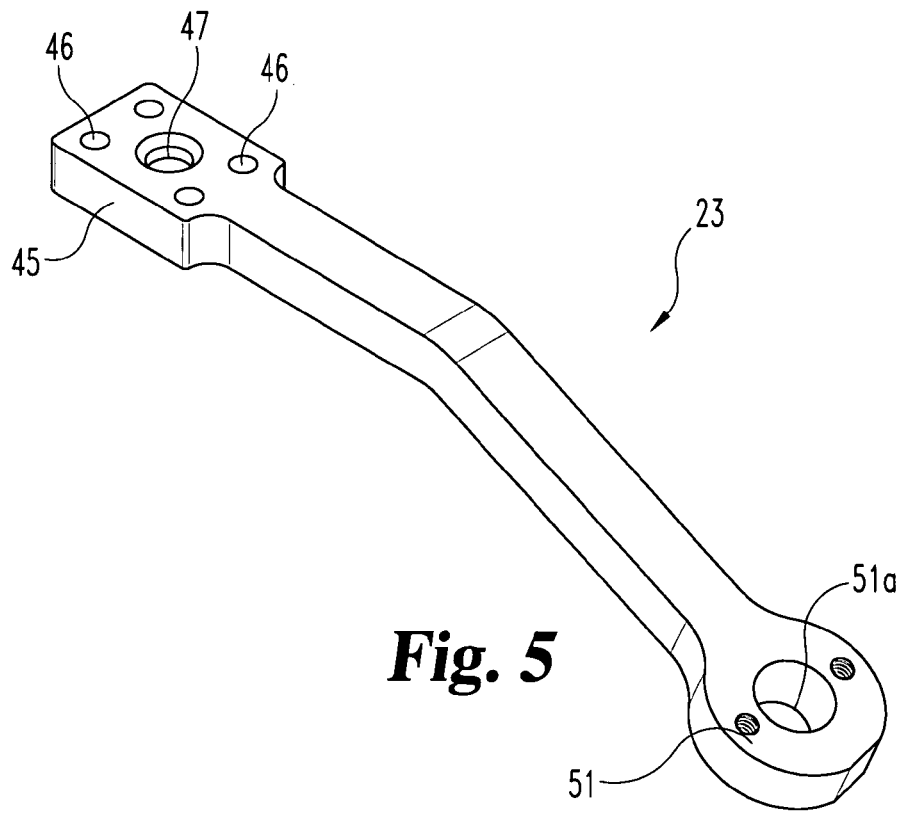
FIG. 5 is a perspective view of a swing arm comprising one component of the FIG. 1 device.
Figure 6:
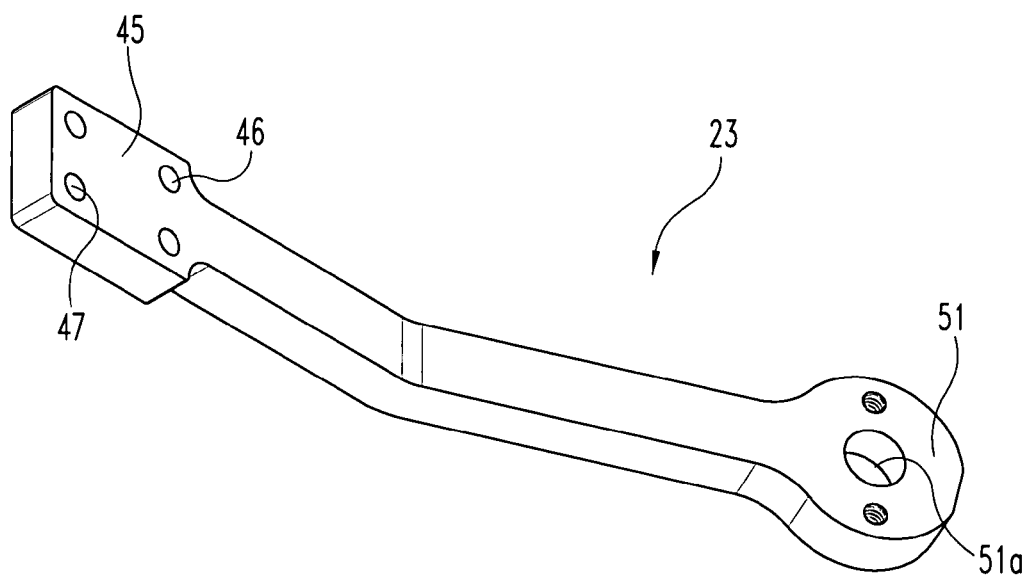
FIG. 6 is a perspective view, of the FIG. 5 swing arm, from a different perspective.
Figure 7:
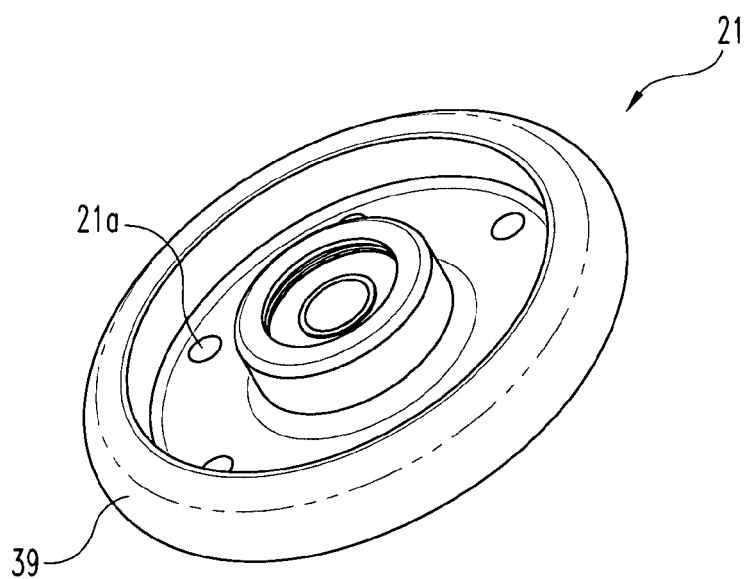
FIG. 7 is a perspective view of a chain wheel comprising one portion of the FIG. 1 device.

The mounting plate 24 (see FIGS. 3 and 4) includes two clearance holes 38 for securely connecting the mounting plate 24 to a vehicle axle by the use of a corresponding U-bolt (not illustrated). The swing arm 23 (see FIGS. 5 and 6) is connected to the chain wheel 21 (see FIG. 7) such that the chain wheel 21 is able to turn or rotate freely so as to sequentially fling strands 22 of chain beneath the corresponding vehicle tire (i.e., between the tire and the surface of the road). The inner surface of the vehicle tire is used to contact the outer rubber rim 39 of wheel 21 and thereby drive the chain wheel 21 in a rotary manner. The rotation of the vehicle tire drives the chain wheel 21 in a manner that is similar to a gear set.

Figure 2:
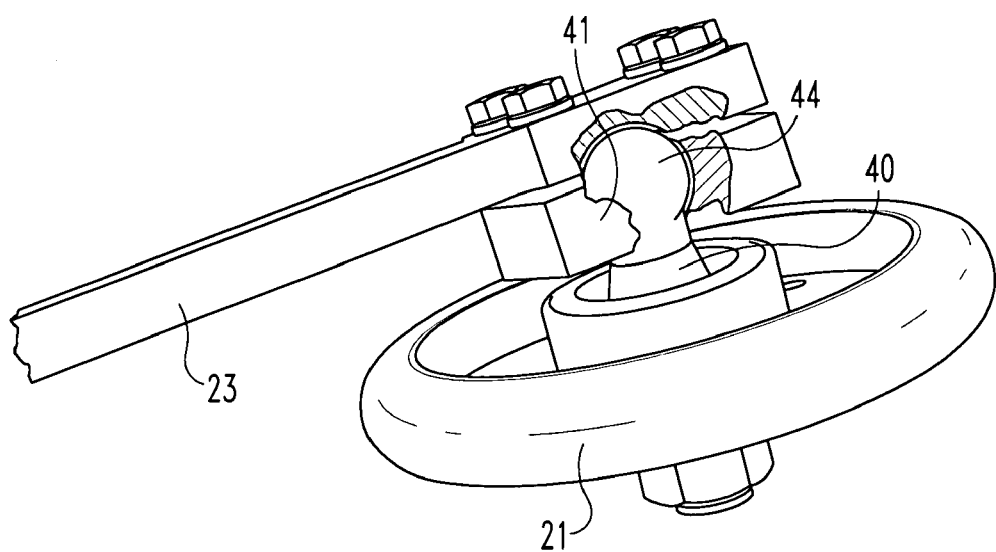
FIG. 2 is a partial, perspective view of a chain wheel assembly comprising one portion of the FIG. 1 device.
Figure 8:
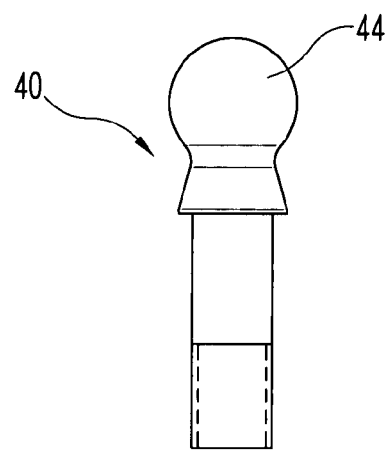
FIG. 8 is a front elevational view of a chain wheel bolt comprising one portion of the FIG. 1 device.
Figure 9:
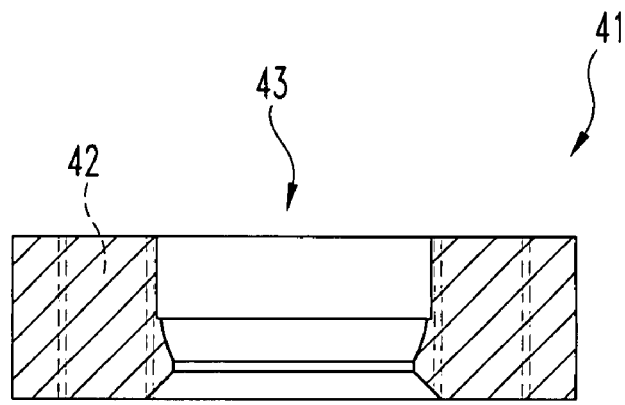
FIG. 9 is a side elevational view, in full section, of a receiver plate comprising one portion of the FIG. 1 device.
Figure 10:
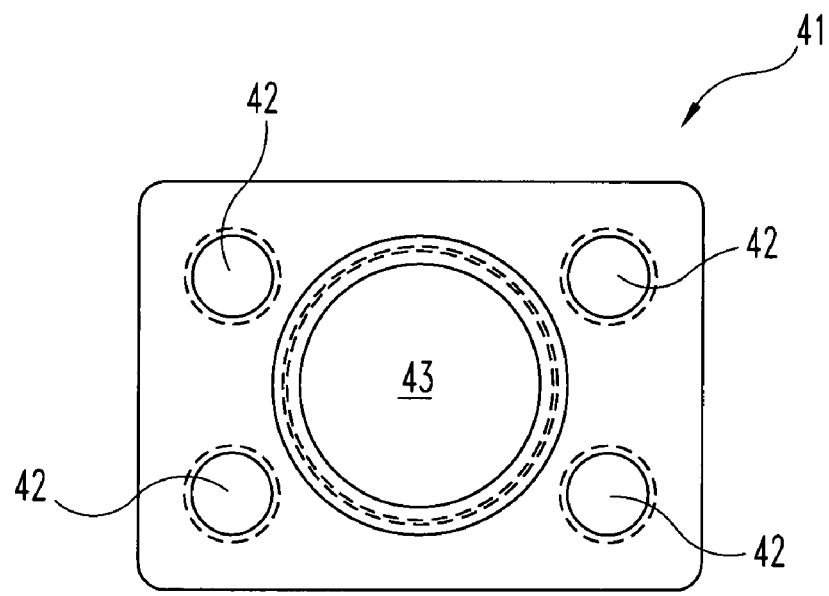
FIG. 10 is a top plan view of the FIG. 9 receiver plate.

Referring now to FIG. 2, a chain wheel bolt 40 (see FIG. 8) extends through the chain wheel 21 and is secured on one side by a hex nut and is captured on the opposite side by receiver plate 41 (see FIGS. 9 and 10). Plate 41 includes four internally-threaded bolt holes 42 and a center bore 43 that receives the enlarged spherical head 44 of the chain wheel bolt 40. End 45 of the swing arm 23 includes four clearance holes 46 with a pattern and spacing that corresponds to that of the four bolt holes 42. The center bore 47 of the swing arm 23 is aligned with the center bore 43, but center bore 47 is smaller since it is constructed and arranged to provide clearance for only the top portion of the spherical head 44. This chain wheel-bolt-arm assembly is substantially the same as that illustrated and disclosed in the '130 patent (see FIG. 1 of the '130 patent).

Figure 20A:
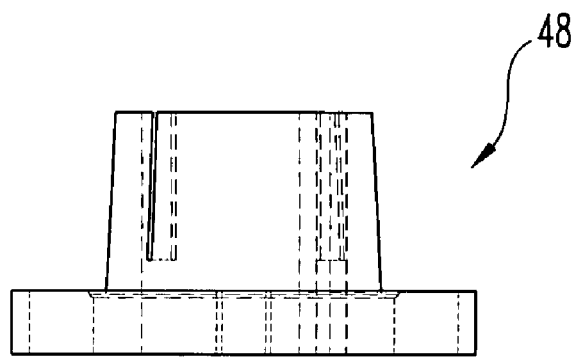
FIG. 20A is a front elevational view of a tapered bushing comprising one portion of the FIG. 1 device.
Figure 20B:
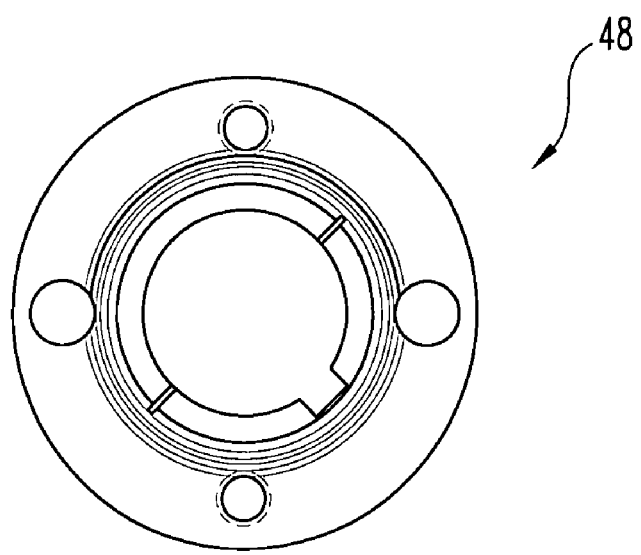
FIG. 20B is a top plan view of the FIG. 20A tapered bushing.

End 51 of swing arm 23 is pivotally connected, via tapered hole 51a, to end 52 of mounting plate 24, specifically by way of hole 52a, by the use of shaft 25 (see FIGS. 11-13) and related components such as tapered bushing 48, see FIGS. 20A and 20B. Beginning with swing arm 23, shaft 25 extends upwardly through bushing 48 that is received within hole 51a. From there, shaft 25 extends through hole 52a and through a circular opening 49 in the floor of housing body 26a. The circular opening 49 is defined by raised boss 74 and this raised boss 74 is positioned within hole 52a, preferably in a generally concentric relationship, see FIG. 13.

Tapered bushing 48 is securely attached to end 51 such that, by pinning arm shaft 25 to and within bushing 48, rotation of shaft 25 results in rotation or pivoting of swing arm 23. This pinned combination and the secure attachment to end 51 means that the pivoting or rotating action of swing arm 23 occurs in direct response to shaft 25 rotation, without any lag or slippage. As illustrated, the tapered bushing 48 fits into tapered hole 51a and is secured around shaft 25 by clamping action. This is facilitated by the two mounting bolts (see FIG. 13).

Figure 13:
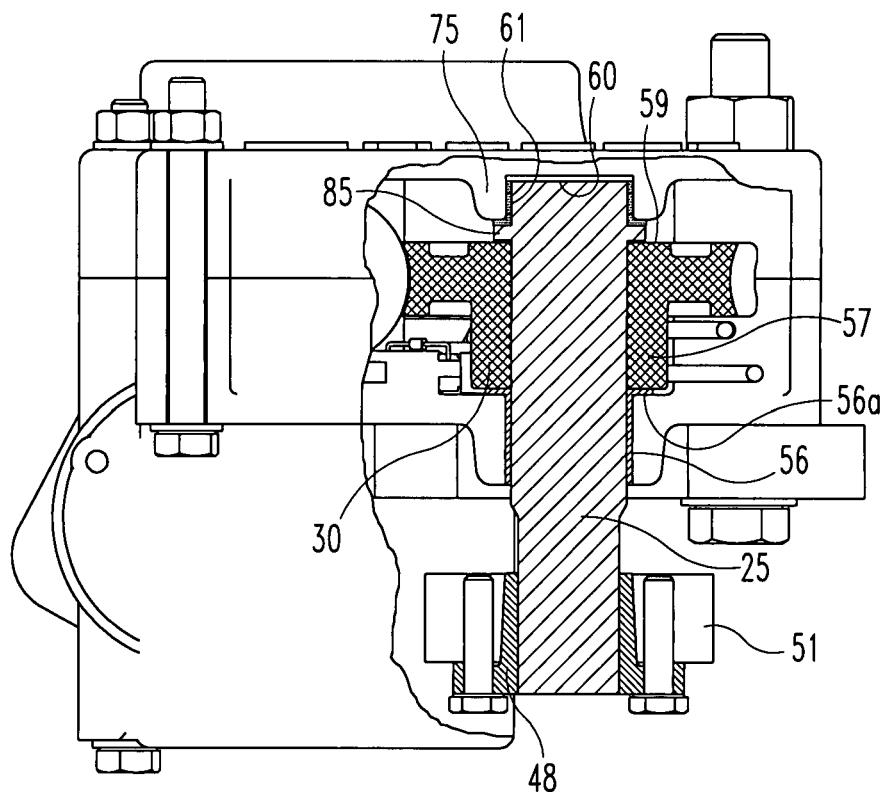
FIG. 13 is a fragmentary, side elevational view, illustrating the assembly of component parts for the pivoting connection of the FIG. 5 swing arm with a worm gear that comprises one portion of the FIG. 1 device.
Figure 21A:
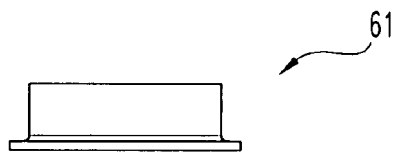
FIG. 21A is a front elevational view of an upper bushing comprising one portion of the FIG. 1 device.
Figure 21B:
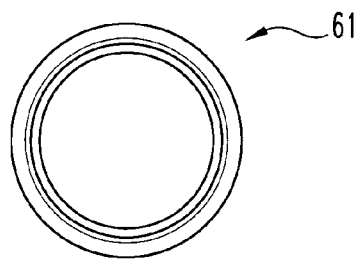
FIG. 21B is a top plan view of the FIG. 21A upper bushing.
Figure 22A:
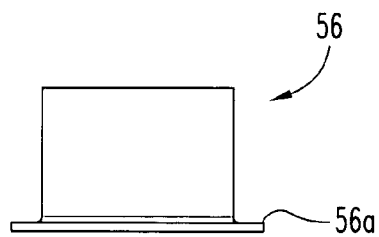
FIG. 22A is a front elevational view of a lower bushing comprising one portion of the FIG. 1 device.
Figure 22B:
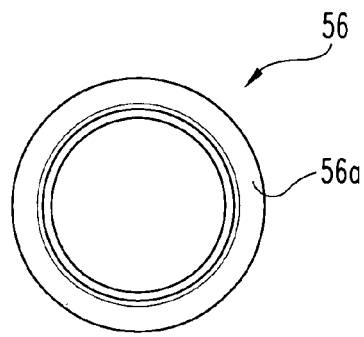
FIG. 22B is a top plan view of the FIG. 22A lower bushing.
Figure 23A:
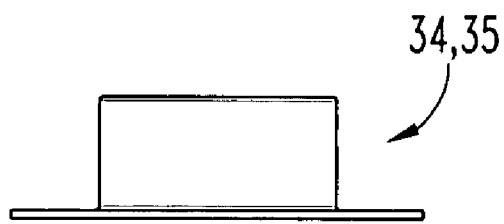
FIG. 23A is a front elevational view of a switch sleeve bushing comprising one portion of the FIG. 1 device.
Figure 23B:
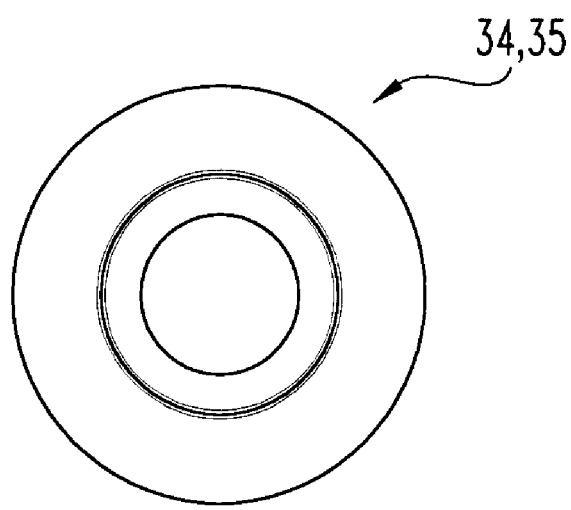
FIG. 23B is a top plan view of the FIG. 23A switch sleeve bushing.

A lower bushing 56 (see FIGS. 22A and 22B), is positioned between shaft 25 and opening 49/boss 74. The radial flange 56a on bushing 56 seats against one end of the worm gear hub 57 (see FIG. 13). The worm gear face 59 seats against the radial lip of shaft 25 identified herein as shaft section 85. The shaft end, referred to as section 84, is captured within the blind hole 60 of the upper housing that is defined by inwardly-extending, raised boss 75. Upper bushing 61 (see FIGS. 21A and 21B), is positioned between shaft section 84 and interior boss 75. This stack up of the components that are cooperatively assembled with shaft 25 is illustrated in FIG. 13.

End 52 of mounting plate 24 provides a clearance hole 52a for arm shaft 25 to extend through for its connection to end 51. The opposite end 53 of arm shaft 25 is securely pinned to worm gear 30 such that as the worm gear 30 turns, the arm shaft rotates without any lag or slippage. With regard to the manner of "pinning" the arm shaft to end 51 and to worm gear 30, any conventional approach for pinning a gear to a shaft is acceptable, such as the use of a keyway or key. In the preferred embodiment, a Woodruff key is used.

The electric motor assembly 27 includes a reversible, electric drive motor 54, a brake 54a, and a gear reduction module 55 that is securely connected to drive shaft 28. The RPM rating of motor 54 is reduced by gearing to a lower RPM so as to constitute a slow drive for a slow drive speed, something that is compatible with the application of a worm and worm gear combination. This slower RPM becomes the rate of turning or rotation for the drive shaft 28. The short shaft 55a from the gear reduction module 55 is coupled to drive shaft 28 by shaft coupling 58. Power "on" to the drive motor 54 includes power "on" to the brake 54a so as to disengage it. This permits the desired operation and deployment of the swing arm. When the limit switch is tripped, the power is switched "off" and the brake prevents the motor shaft from turning in the reverse direction.

Figure 14:
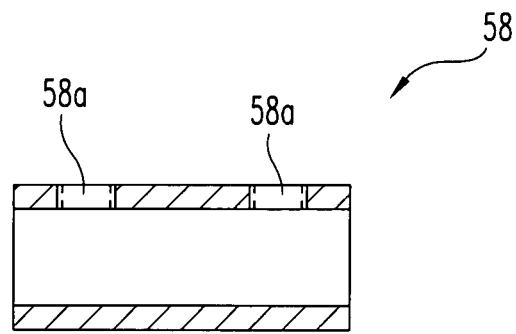
FIG. 14 is a front elevational view, in full section, of a shaft coupling comprising one portion of the FIG. 1 device.

Shaft coupling 58 (see FIG. 14) is a hollow, substantially cylindrical component with a pair of spaced-apart, internally-threaded holes 58a for receipt of set screws for securing shaft 55a and drive shaft 28. Each shaft includes a "D" flat shape at the shaft end that is inserted into coupling 58. A snug fit between shafts 55a and 28 and the hollow interior of coupling 58 can be used to facilitate a tight and secure connection such that there is no relative motion or slippage.

The worm 29 is keyed to the drive shaft 28 such that as the drive shaft 28 turns (i.e., rotates on axis), the worm 29 turns in response without any lag or slippage. However, the worm 29 is keyed to the drive shaft 28 in a manner such that the worm 29 is able to move (i.e., slide) along the axial length of the drive shaft, at least a short distance as will be described hereinafter.

The worm gear 30 is meshed with the worm 29 and this particular combination is preferable for low speed applications and where a large amplification of power is desired. As the worm 29 turns, i.e., rotates on axis with shaft 28, the worm gear 30 is driven and the arm shaft 25 rotates. As this occurs, the worm 29 maintains its "centered" position on the worm gear 30 and its position between the two springs 31a and 31b. Another aspect of a worm and worm gear combination is that the corresponding axes of rotation or drive are at right angles to one another. The turning of arm shaft 25 causes the pivoting of swing arm 23 for both deploying the swing arm as well as for retracting the swing arm.

An understanding of worm and worm gear technology and the basic design principles is important to an understanding of what occurs as the motor 54 continues to run. First, as previously noted, the worm 29 includes a keyway and the drive shaft 28 is machined with a matching key that fits into this key way. As the drive shaft 28 turns, the worm 29 turns and the threads of the worm 29 mesh with the gear teeth of the worm gear 30. The axis of rotation of the gear 30 is perpendicular to the axis of rotation of the worm 29. The rotation of the gear 30 and its meshing action with the worm 29 creates one force vector tending to turn the worm gear and another force vector tending to move the worm along the axis of the drive shaft 28. The pair of biasing springs 31a and 31b, one on each side of worm 29, and each captured by abutment against a corresponding bushing 34 and 35, respectively, restricts the travel of worm 29. As the worm remains substantially stationary, the driving forces are focused on rotation of worm gear 30. As the worm gear 30 rotates about its axis, the swing arm 23 pivots.

Device 20 is constructed and arranged and is mounted to the axle of a vehicle such that the pivoting motion of swing arm 23 properly positions the rim 39 of chain wheel 21 against the inside surface of the corresponding vehicle tire. As the tire rotates, it drives the chain wheel 21, causing the strands 22 of chain to be sequentially thrown between the tire and the road surface.

Once the chain wheel 21, specifically rim 39, contacts the inner surface of the corresponding tire, more force is required to push the chain wheel 21 against the tire. This force is exerted while the motor assembly 27 continues running and continues to push the chain wheel 21 against the tire. Although the drive motor 54 continues running, at least for a period of time, the swing arm is unable to pivot any farther due to the chain wheel and tire contact. This in turn stops the rotation of the worm gear 30. With the rotation of worm gear 30 stopped, though with the drive motor continuing to run, the mesh of the worm 29 with worm gear 30 causes the worm 29 to begin to turn and thereby to travel axially along drive shaft 28. The worm 29 is described as "climbing" the drive shaft 28 in an axial direction. The key portion of the drive shaft 28 and the keyway in the worm 29 allows the worm to move longitudinally along the drive shaft 28, thereby compressing the extend spring 31a. As the extend spring 31a is compressed, the worm 29 travels in the direction of the extend limit switch 32. A switch sleeve bushing 34 is mounted between the worm 29 and the extend spring 31a and this switch sleeve bushing 34 is used to trip the extend limit switch 32. The limit switch arm, once tripped by the switch sleeve bushing 34, shuts off power to the drive motor 54 and the brake 54a. Once the drive motor 54 is switched off, the worm 29 remains fixed in position and meshed with the worm gear 30. The brake 54a prevents the motor shaft from turning in the reverse direction. The spring 31a, functioning in a spring-biasing mode, maintains constant pressure of the chain wheel 21 against the tire. With the drive motor 54 shut off and the spring 31a compressed, the spring's function now is to continue pushing the worm 29 against the worm gear 30, and in turn, maintaining the desired chain wheel 21 contact against the tire. As the rotation has stopped, the worm and worm gear now function as a cog-type gear using the meshed teeth of the worm against the teeth of the worm gear to push the swing arm 23 and keep the chain wheel 21 against the tire.

Figure 24:
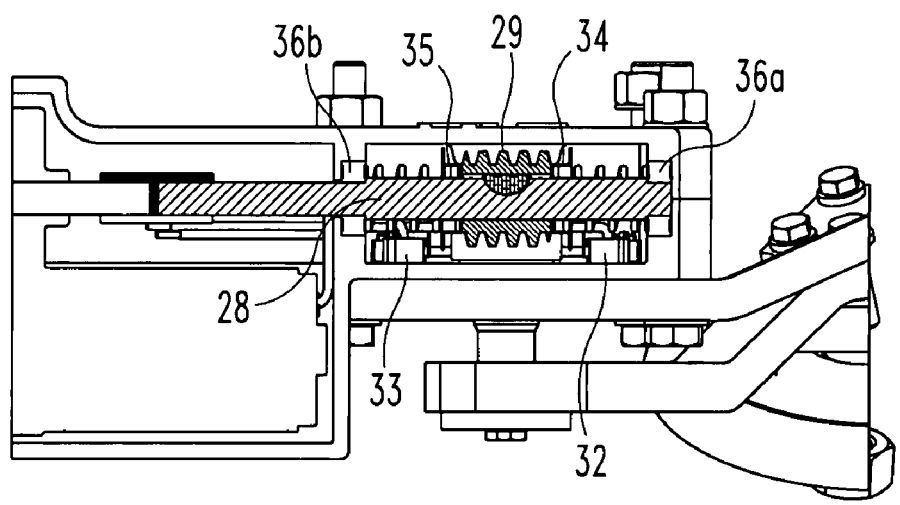
FIG. 24 is a side elevational view, in full section, illustrating the assembly of components parts associated with the drive shaft according to the present invention.

The previously referenced dashboard-mounted switch is a double pull, single throw switch that is wired into device 20 such that when toggled to the retract position, the voltage to the motor assembly 27 is reversed. This causes the motor assembly to turn the drive shaft 28 in the reverse direction. This drives the swing arm 23 back to its retracted position (stowed) and, in the process, the retract limit switch 33 is tripped by a second switch sleeve bushing 35 which is positioned between worm 29 and the retract limit switch 33. When the retract limit switch 33 is tripped and power to the motor assembly 27 is shut off, the motor 54 stops and the swing arm 23 remains in its stowed position. The retracting action of the swing arm, the overall drive motion and movement, including the timing, and the manner of using the various components are all substantially the same for the retracting cycle as they are for the extending or deploying cycle, albeit in the reverse order or reverse direction. The stack up of components associated with drive shaft 28 are illustrated in FIG. 24.

Figure 15A:
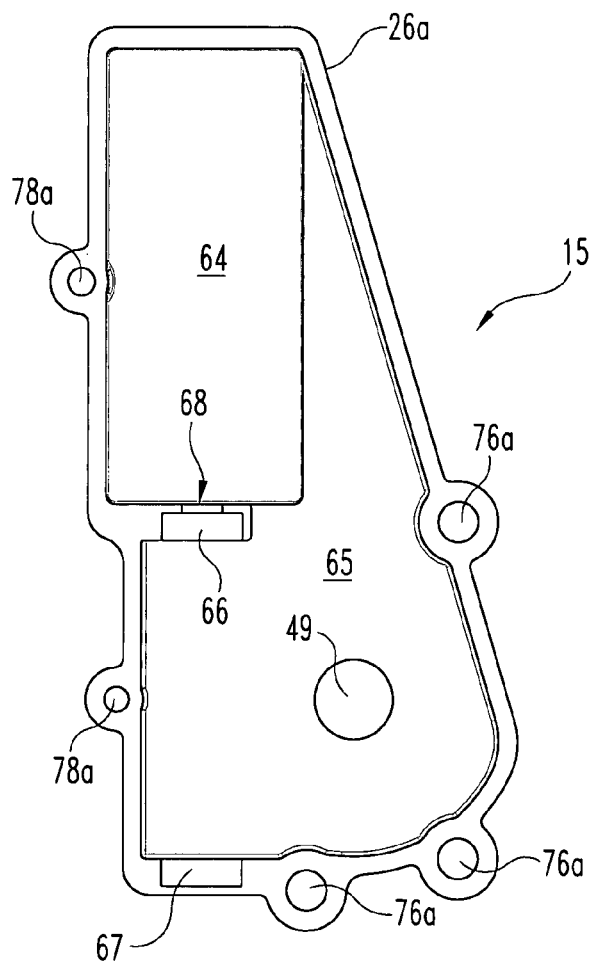
FIG. 15A is a top plan view of a lower housing section comprising one portion of the FIG. 1 device.
Figure 15B:
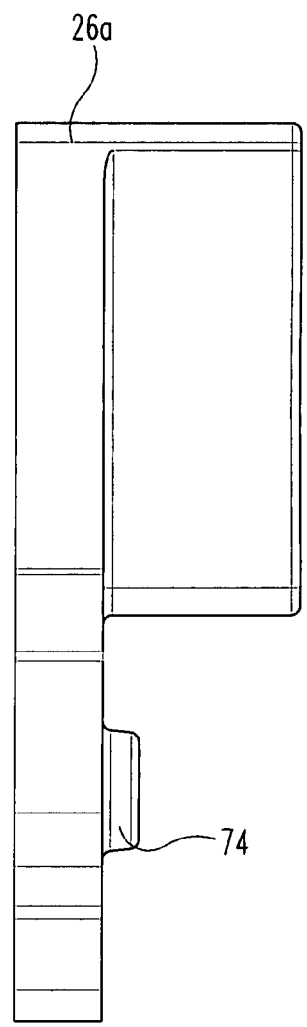
FIG. 15B is a side elevational view of the FIG. 15A lower housing.
Figure 16A:
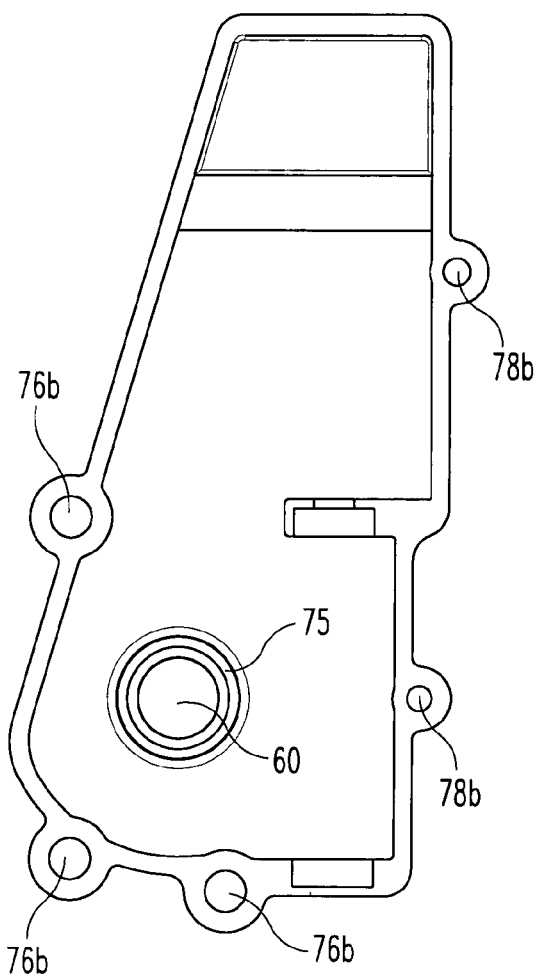
FIG. 16A is a top plan view of an upper housing comprising one portion of the FIG. 1 device.
Figure 16B:
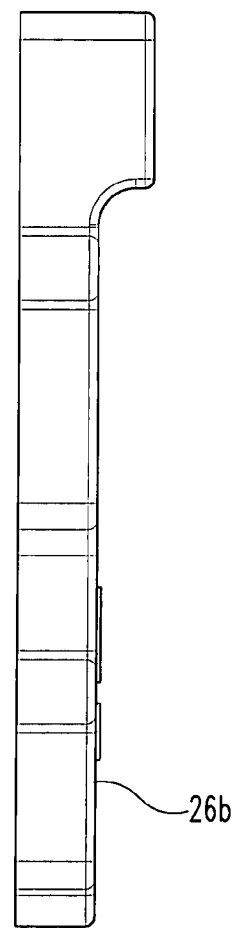
FIG. 16B is a side elevational view of the FIG. 16A upper housing.

With reference to the component part drawings of FIGS. 3-12 and 14-23B, some of the structural details of the primary parts are illustrated and are further described hereinafter. Referring first to FIGS. 15 and 16, the housing 26 is constructed and arranged into two housing sections 26a and 26b, each section being shaped with a hollow interior that is constructed and arranged to provide clearance spaces via cavities 64-68 for receipt of various component parts. From a size and tolerance perspective, these cavities 64-68 can be used in the "as-cast" condition. The corresponding component parts include, by way of example, the arm shaft 25 (hole 49), electric motor assembly 27 (into space 64), drive shaft 28 (through hole 68), worm 29 (into space 64), worm gear 30 (into space 65), springs 31a and 31b, limit switch 32, limit switch 33, sealed bearings 36a and 36b (into spaces 66 and 67). The two housing sections 26a and 26b are securely bolted together by hex head bolts 69a and 69b and cooperating hex nuts 70a and 70b.

Hole 49 extends through a raised boss 74 that receives a bushing or bearing. The cover 26b includes a matching and aligned interior boss 75 that is constructed and arranged to receive a corresponding bushing or bearing. One end of shaft 25 is received within boss 75 while a portion of the shaft body extends through boss 74 for ultimate assembly to swing arm 23.

Each housing portion 26a and 26b includes three mounting holes 76a and 76b, respectively, that receive bolts 69a and hex nut 70a. These three holes are arranged in a pattern that matches the three holes 77 in mounting plate 24. Bolts 69a are positioned so that the head is against plate 24. After the housing cover 26b is assembled, the nuts 70a are tightened in place. The other two mounting hole locations 78a in housing base 26a can be either tapped holes into the housing body 26a or through holes, similar to holes 77. If through holes are used, bolts 69b and nuts 70b are used in a manner similar to bolts 69a and nuts 70a. If tapped holes are used, bolts 69b install from the top of the housing cover 26b through holes 78b and nuts 70b are not required.

Figure 11:
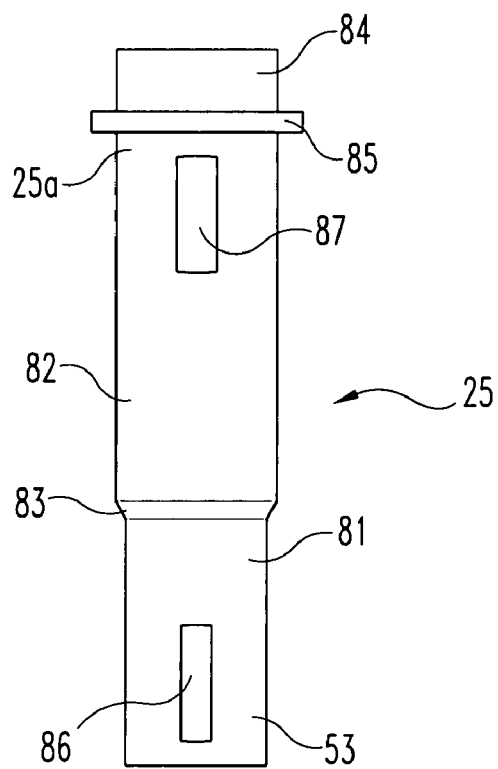
FIG. 11 is a front elevational view of an arm shaft comprising one portion of the FIG. 1 device.
Figure 12:
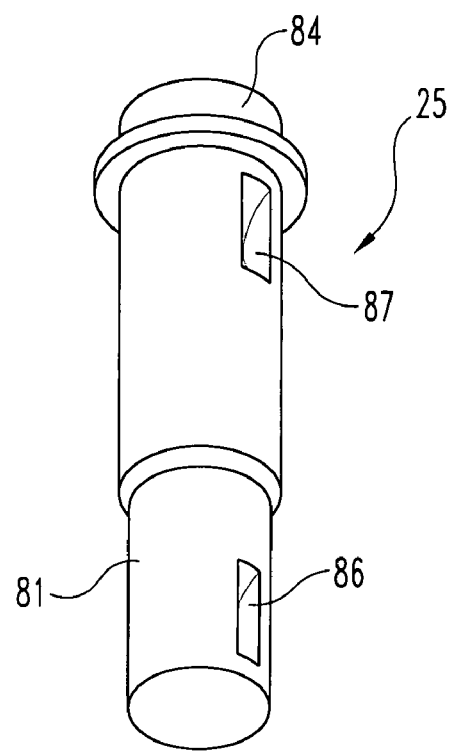
FIG. 12 is a perspective view of the FIG. 11 arm shaft.

With reference to FIGS. 11 and 12, shaft 25 includes five sections 81-85 and two recesses 86 and 87. As illustrated, section 81 has a generally cylindrical shape with a keying recess 86. Section 82 has a generally cylindrical shape with a keying recess 87. Section 83 has a beveled shape and is positioned between the smaller diameter of section 81 and the larger diameter of section 82 as a transition portion. Section 84 has a generally cylindrical shape and is inserted into worm gear 30. Section 85 provides a positioning seat for worm gear 30. Sections 81-85 are all coaxial with each other and the axis of shaft 25 is the axis of rotation for gear 30.

Figure 17:
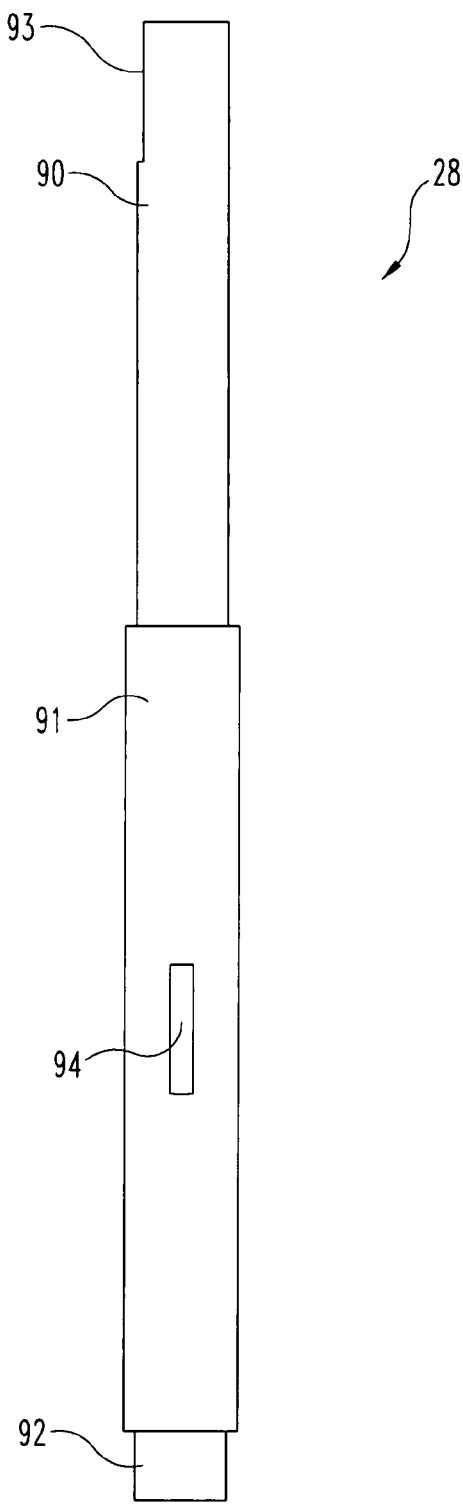
FIG. 17 is a front elevational view of a drive shaft comprising one portion of the FIG. 1 device.
Figure 18:
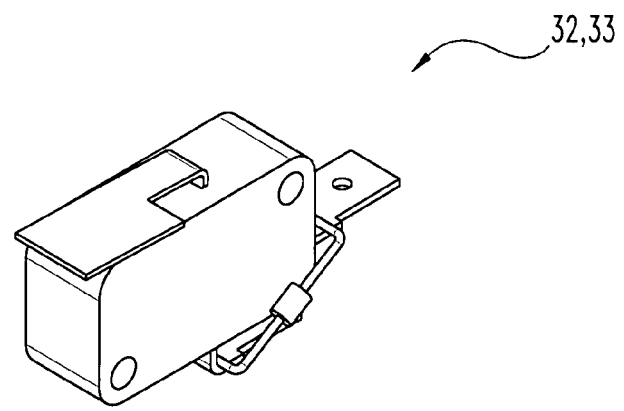
FIG. 18 is a perspective view of a limit switch, two of which are used for the FIG. 1 device.
Figure 19:
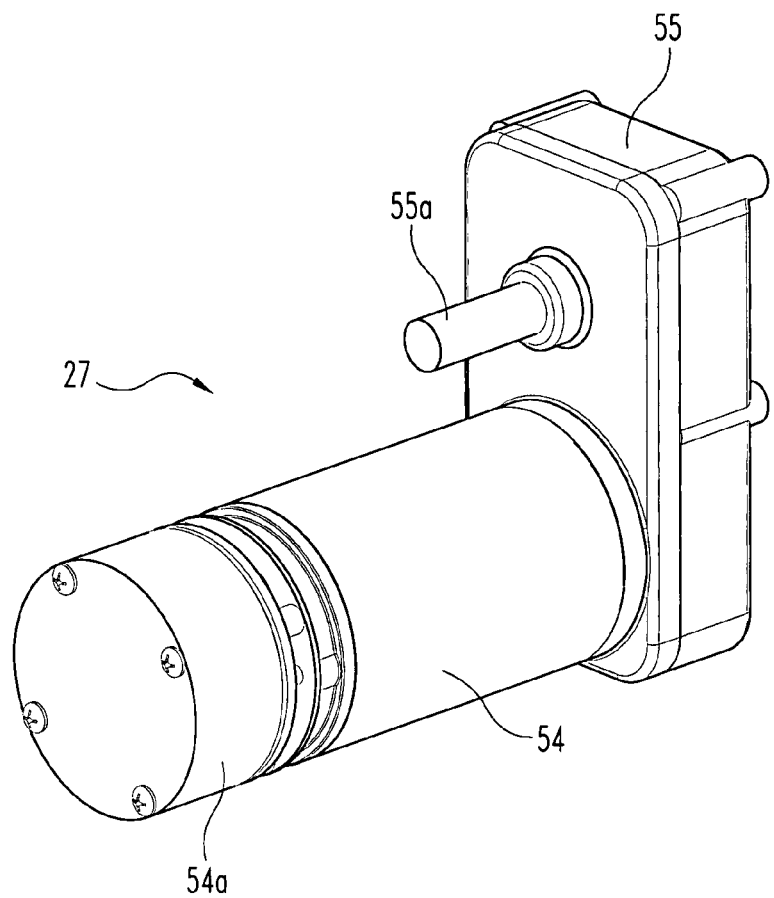
FIG. 19 is a perspective view of an electric motor assembly comprising one portion of the FIG. 1 device.

Referring to FIG. 17, drive shaft 28 includes three sections 90, 91 and 92. Section 90 includes a D-flat end 93 that inserts into one end of shaft coupling 58. The opposite end of section 90 is received by bearing 36b. The flat cooperates with the set screw threaded into one hole 58a. Section 91 receives worm 29 and uses recess 94 to key the worm 29 onto section 91. Section 92 is received by bearing 36a.

As for the electronics or electrical control arrangement for the disclosed device, additional details follow. There are two limit switches 32 and 33 and these are each single pole, normally closed momentary switches that are wired in series. When the springs are compressed enough to push the switch trip mechanism, the contacts open and the motor stops. Once the dashboard switch is turned off, the voltage reverses and the motor runs in the opposite direction. However, one of the switches is still open from the activation it just performed. A diode is used to allow the "reversed current" to pass through just long enough to run the motor and worm so that the switch can make contact again and run the motor in the opposite or reverse direction until the retracted switch is opened in the same fashion as the activation switch. The retracted switch also has a diode waiting on the voltage to be reversed again for another activation cycle. At the time the current is reversed, the switch waiting to receive tripping contact by the switch sleeve bushing is always closed, thereby completing the path for the electrical power. The diodes are preferred in order to complete the current path for a very short time until the switch is freed and can make its own contacts.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. An anti-skid device for use in cooperation with a vehicle wheel for positioning a traction member beneath the vehicle wheel, said anti-skid device comprising:
    a support member constructed and arranged to be attached to a vehicle;
    a swing arm including a traction wheel with at least one traction member secured to said traction wheel;
    a drive assembly attached to said support member and to said swing arm and being constructed and arranged to extend and retract said swing arm, wherein extending said swing arm places said traction wheel in contact against an inner surface of said vehicle wheel; and
    said drive assembly including a worm gear, a worm constructed and arranged to mesh with said worm gear, a drive motor, first means for coupling said swing arm to said worm gear, second means for coupling said drive motor to said worm and a biasing spring, wherein operation of said drive motor moves said swing arm via said worm and worm gear combination, wherein said drive assembly further includes a first limit switch constructed and arranged to stop the operation of said drive motor and wherein said biasing spring cooperates in maintaining the contact of said traction wheel against said inner surface.

2. The device of claim 1 wherein said first means includes an arm shaft.

3. The device of claim 2 wherein said second means includes a drive shaft.

4. The device of claim 3 wherein said biasing spring is positioned at one end of said worm and wherein said drive assembly further includes a second spring received by said drive shaft, said second spring being positioned at another end of said worm.

5. The device of claim 4 wherein said drive assembly further includes a second limit switch constructed and arranged to stop, via said drive motor, retracting rotation of said drive shaft.

6. The device of claim 5 which further includes a first switch sleeve positioned between said biasing spring and said worm and being constructed and arranged to trip said first limit switch.

7. The device of claim 6 which further includes a second switch sleeve positioned between said second spring and said worm and being constructed and arranged to trip said second limit switch.

8. The device of claim 7 wherein said traction wheel is connected to said swing arm by a wheel bolt.

9. The device of claim 8 wherein said wheel bolt includes an enlarged spherical head.

10. The device of claim 1 wherein said drive assembly further includes a second limit switch constructed and arranged to stop the operation of said drive motor.

11. An anti-skid device for use in cooperation with a vehicle wheel for positioning a traction member beneath the vehicle wheel, said anti-skid device comprising:
    a swing arm including a traction wheel with at least one traction member secured to said traction wheel; and
    a drive assembly including a drive motor, a worm, a worm gear and a biasing spring, the drive motor being operably coupled to said worm for the rotation of said worm, said worm being constructed and arranged to mesh with said worm gear and said worm gear being operably coupled to said swing arm for extending said swing arm so as to place said traction wheel in contact with an inside surface of a vehicle wheel, wherein said drive assembly further includes a first limit switch constructed and arranged to stop the operation of said drive motor and wherein said biasing spring cooperates in maintaining the contact of said traction wheel against said inner surface.

12. The device of claim 11 which further includes a drive shaft coupled to said drive motor and receiving said worm.

13. The device of claim 12 which further includes an arm shaft connected to said swing arm and to said worm gear.

14. The device of claim 13 wherein said drive assembly is constructed and arranged for retracting said swing arm and further includes a second limit switch constructed and arranged to stop, via said drive motor, retracting rotation of said drive shaft.

15. The device of claim 11 wherein said drive assembly further includes a second limit switch constructed and arranged to stop the operation of said drive motor.

16. An anti-skid device for use in cooperation with a vehicle wheel for positioning a traction member beneath the vehicle wheel, said anti-skid device comprising:
   a support member constructed and arranged to be attached to a vehicle;
   a swing arm including a traction wheel with at least one traction member secured to said traction wheel;
   a drive assembly attached to said support member and to said swing arm and being constructed and arranged to extend and retract said swing arm, wherein extending said swing arm places said traction wheel against an inner surface of said vehicle wheel; and
   said drive assembly including a worm gear, a worm constructed and arranged to mesh with said worm gear, a drive motor having a drive motor shaft, a drive motor brake, means for coupling said swing arm to said worm gear and a biasing spring, wherein said drive motor shaft is constructed and arranged for coupling said drive motor to said worm, wherein operation of said drive motor turns said drive motor shaft in a first direction which moves said swing arm via said worm and worm gear combination and wherein said drive motor brake is constructed and arranged to prevent said drive motor shaft from turning in a second direction which is the reverse of said first direction, and wherein said biasing spring cooperates in maintaining the contact of said traction wheel against said inner surface.

17. An anti-skid device for use in cooperation with a vehicle wheel for positioning a traction member beneath the vehicle wheel, said anti-skid device comprising:
   a swing arm including a traction wheel with at least one traction member secured to said traction wheel; and
   a drive assembly including a drive motor having a drive motor shaft, a drive motor brake, a worm, a worm gear and a biasing spring, the drive motor being operably coupled to said worm for the rotation of said worm, said worm being constructed and arranged to mesh with said worm gear and said worm gear being operably coupled to said swing arm for extending said swing arm so as to place said traction wheel in contact with an inside surface of a vehicle wheel, wherein said drive motor brake is constructed and arranged to prevent turning of said drive motor shaft and wherein said biasing spring cooperates in maintaining the contact of said traction wheel against said inner surface.

\* \* \* \* \*